United States Patent [19]

Fantino

[11] Patent Number: 5,580,412
[45] Date of Patent: Dec. 3, 1996

[54] APPARATUS AND METHOD FOR THE PRODUCTION OF A COMPOSITE STRUCTURE WITH AN INTERMEDIATE THREE-DIMENSIONAL TEXTILE

[75] Inventor: Marco Fantino, Genoa, Italy

[73] Assignee: Metalleido S.R.L., Genoa, Italy

[21] Appl. No.: 507,999

[22] Filed: Jul. 27, 1995

Related U.S. Application Data

[63] Continuation of Ser. No. 150,116, filed as PCT/IT92/00059 May 28, 1992 published as WO92/21511 Dec. 10, 1992, abandoned.

[30] Foreign Application Priority Data

May 29, 1991 [IT] Italy .................................. TO91A0397

[51] Int. Cl.⁶ .................................................... B29C 65/00
[52] U.S. Cl. .................... 156/285; 156/161; 156/163; 156/311; 156/358; 156/359; 264/137; 264/511; 264/258; 425/405.1; 425/407; 425/411; 425/415
[58] Field of Search .................................. 156/285, 161, 156/163, 311, 358, 359; 264/137, 511, 258; 425/405.1, 407, 411, 415

[56] References Cited

U.S. PATENT DOCUMENTS

| | | |
|---|---|---|
| 3,045,319 | 7/1962 | Scheel . |
| 3,591,444 | 7/1971 | Hoppe . |
| 3,592,435 | 7/1971 | Mattingly .................................... 249/1 |
| 4,318,682 | 3/1982 | Larson et al. ............................ 425/411 |
| 4,389,447 | 6/1983 | Disselbeck et al. ...................... 428/178 |
| 4,420,359 | 12/1983 | Goldsworthy ........................... 156/379.8 |
| 4,551,085 | 11/1985 | Epel et al. ............................. 425/405 R |
| 4,786,351 | 11/1988 | Elliott et al. .............................. 156/245 |
| 4,879,152 | 11/1989 | Green ......................................... 428/73 |

FOREIGN PATENT DOCUMENTS

| | | |
|---|---|---|
| 0293612 | 12/1988 | European Pat. Off. . |
| 0352770 | 1/1990 | European Pat. Off. . |
| 9221511 | 12/1992 | WIPO . |

OTHER PUBLICATIONS

European Search Report–PCT/IT 92/00059–Sep. 15, 1992.

*Primary Examiner*—Marion E. McCamish
*Assistant Examiner*—Kathleen L. Choi
*Attorney, Agent, or Firm*—Pearne, Gordon, McCoy & Granger

[57] ABSTRACT

A method and an apparatus for the production of a three-dimensional textile (3), wherein the textile (3) is formed from two sheets of textile (5, 6) placed face to face and connected together by a plurality of threads (10), impregnated with resin and inserted between two layers (16, 17) so as to form a layered structure (1). This layered structure (1) is inserted between two dies (25, 26) of a heated press which is subsequently closed to allow the resin impregnating the structure to distribute itself uniformly. The layers (16, 17) are then attached by vacuum to the faces of the dies (25, 26) which are then opened through a first controlled distance within the limit of the elastic recovery of the three-dimensional textile (3). The outermost layers of the structure (1) are then polymerized by heating the dies (24, 26) while the resin impregnating the threads (10) remains in a plastic state. The lower die (25) is then released in the plane in which it lies and the dies (25, 26) are then moved apart through a second distance so as to stretch the treads of the three-dimensional textile and align them substantially vertically; the floating die (25, 26) is then locked. The dies (25, 26) are then moved away from each other to a predetermined distance to extend the threads (1) completely and the press (28) is kept in this position until all the resin has polymerized completely, the structure hardening in the position assumed.

24 Claims, 5 Drawing Sheets

APPARATUS AND METHOD FOR THE PRODUCTION OF A COMPOSITE STRUCTURE WITH AN INTERMEDIATE THREE-DIMENSIONAL TEXTILE

This is a continuation of application Ser. No. 08/150,116, filed as PCT/IT92/00059 published as WO92/21511 filed Dec. 10, 1992, now abandoned.

TECHNICAL FIELD

The present invention relates to a method for the production of a composite structure with an intermediate three-dimensional textile, to a structure made by this method and to apparatus for carrying it out.

BACKGROUND ART

Composite structures are known for example of the type described in Italian patent application number 12441-A/90 entitled: "Method for the Production of Sandwich Structures" filed on 26 Mar. 1990 by the same Applicants, including a so-called three-dimensional textile which is formed from two sheets of textile placed face to face and connected together by a plurality of threads extending from the adjacent surfaces of the sheets.

In order to form such structures, the three-dimensional textile, impregnated with resin, is placed in a die and an expanded resin is injected into the space between the sheets and, in expanding, forces apart the sheets which then come into contact with the surfaces of the die. In such composite structures, the expanded resin determines the mechanical characteristics and the thermally insulating properties of the structure itself.

Study has also been made of the manufacture of a composite structure of the type described above which is at least partially hollow, this being made by impregnating a three-dimensional textile with a fluid thermo-setting resin and, instead of expanded resin, blowing in compressed gas in order to force the sheets apart and form an interspace between the sheets themselves.

These methods although having the distinctiveness of generating structures with sculptured geometries, in the construction of flat structures (panels) sometimes give geometric and dimensional irregularities (for example, undulations in the surfaces and a non-constant thickness).

DISCLOSURE OF INVENTION

The object of the present invention is to form a composite structure with an intermediate three-dimensional textile in a relatively simple and repeatable manner, the structure overcoming the disadvantages mentioned above, that is, having well defined physical, mechanical and dimensional characteristics and being relatively cheap to produce.

The following object is achieved by the present invention which relates to a method for the production of composite structures with intermediate three-dimensional textiles, characterised in that it comprises:

- a first phase in which a layered structure is inserted between first and second dies of a press; the layered structured including at least one three-dimensional textile constituted by two sheets of textile disposed in parallel and connected together by at least one plurality of threads extending from facing surfaces of the sheets; at least one pair of layers disposed facing the said sheets on the outside of the said structure; at least the said three-dimensional textile also being impregnated with a resin; the dies being provided with means for attaching the said layers to their surfaces;
- a second phase in which the dies are at least partially closed and the three-dimensional textile is pressed between the layers and the resin impregnating the said sheets distributes itself between the parts in contact, also permeating the threads uniformly;
- a third phase in which the layers are attached firmly to the dies;
- a fourth phase in which the dies are reopened through a certain distance within the limit of the natural elastic recovery of the three-dimensional textile due to the action of the combination of threads tending to straighten themselves;
- a fifth phase in which at least partial polymerisation of the resin present between the layers and the outermost sheets of the three-dimensional textile is obtained while the resin impregnating the threads remains substantially in a plastic state;
- a sixth phase in which the dies are opened to a predetermined distance in order to move the sheets away from each other and extend the threads to form a partially hollow structure;
- a seventh phase in which the structure remains clamped between the two dies until the polymerisation of the resin is complete;
- an eighth phase in which the layers are released from the surfaces of the dies, the dies are opened completely and the layered structure is removed from the press.

BRIEF DESCRIPTION OF DRAWINGS

The invention will now be illustrated, by way of non-limitative example, with particular reference to the appended drawings in which.

BEST MODE FOR CARRYING OUT THE INVENTION

Figure 1:
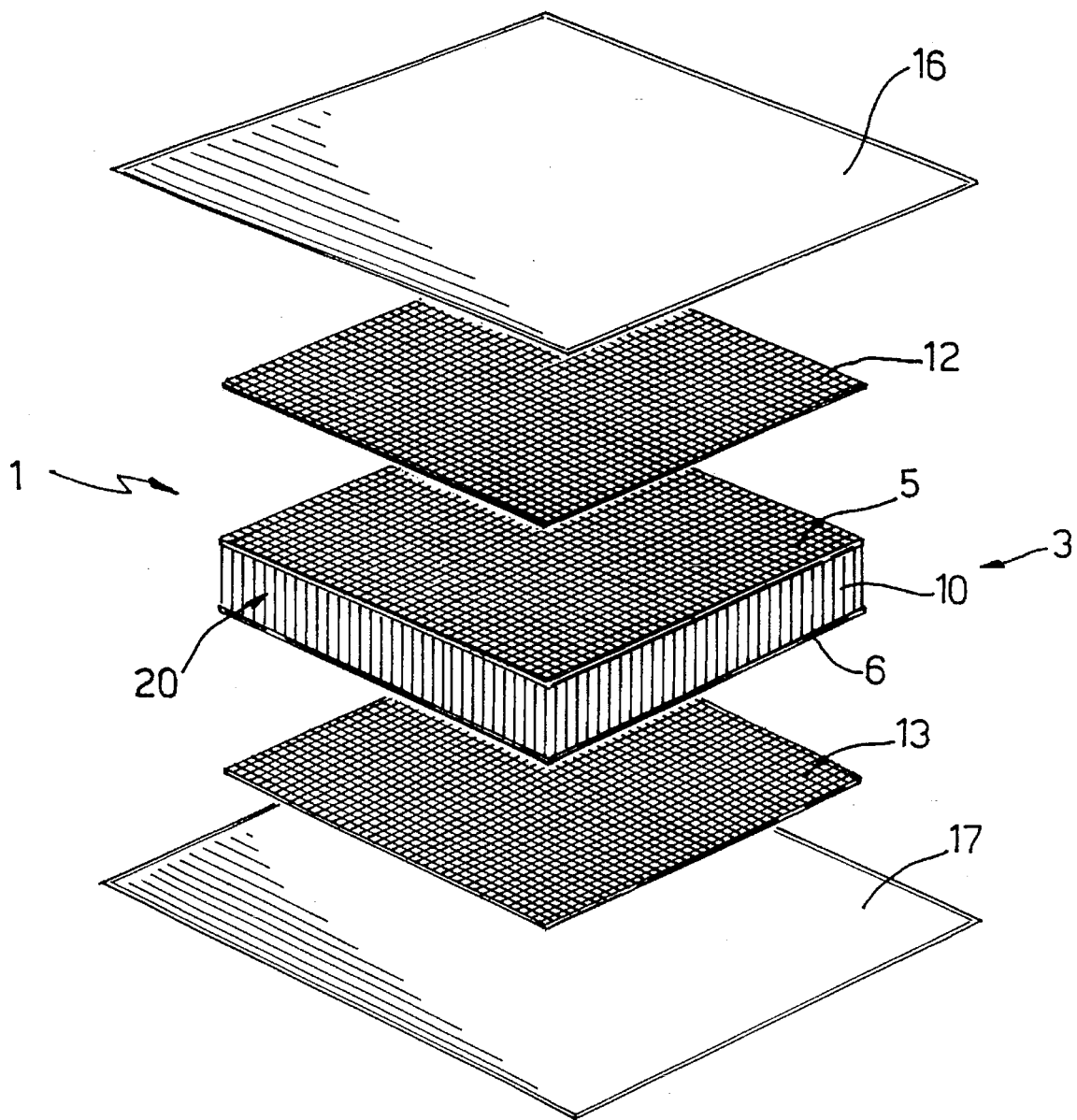
FIG. 1 is an exploded perspective view of a layered structure used for the production of the composite element according to the present invention.
Figure 14:
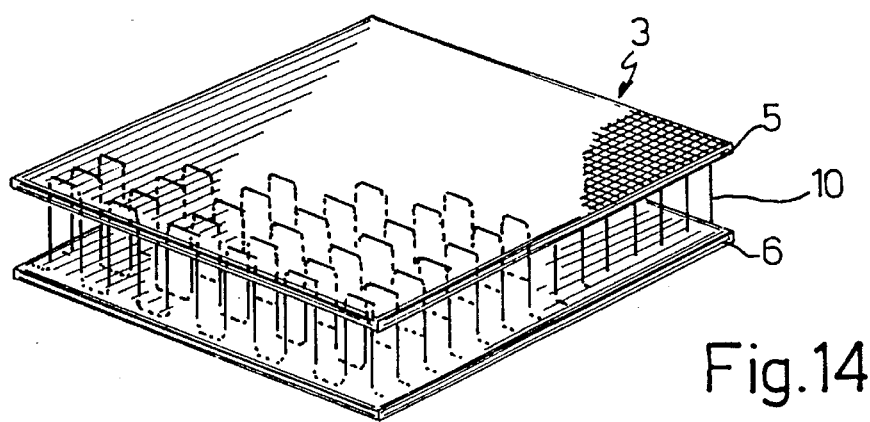
FIGS. 14 and 15 are perspective views respectively of a first and a second embodiment of a three-dimensional textile of the type used in the layered structure illustrated in FIG. 1.
Figure 15:
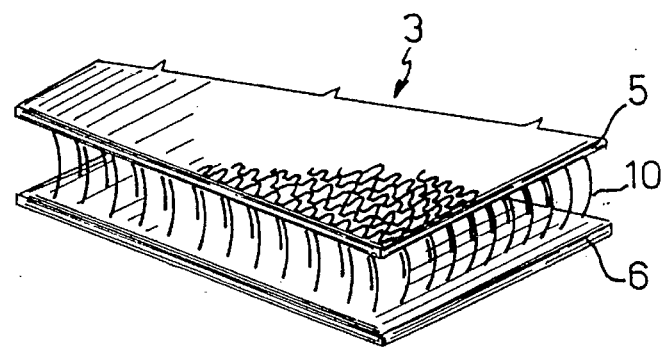

In FIG. 1, a layered structure is generally indicated 1 and includes a three-dimensional textile 3 of known type formed from a pair of woven sheets (FIG. 14) or knitted sheets (FIG. 15) 5 and 6 disposed face to face and connected together by a plurality of threads 10 extending between the adjacent surfaces of the sheets 5 and 6, and a pair of woven sheets 12 and 13 disposed face to face with the sheets 5 and 6.

The layered structure 1 further includes a pair of layers 16 and 17 disposed in contact with the sheets 12 and 13 respectively and conveniently made from plastics, metal or other material.

The three-dimensional textile 3 and the sheets 12 and 13 are also completely impregnated with a thermo-setting plastics resin 20 (for example, a phenolic, epoxy, bismaleic, or polyester resin).

Figure 2:
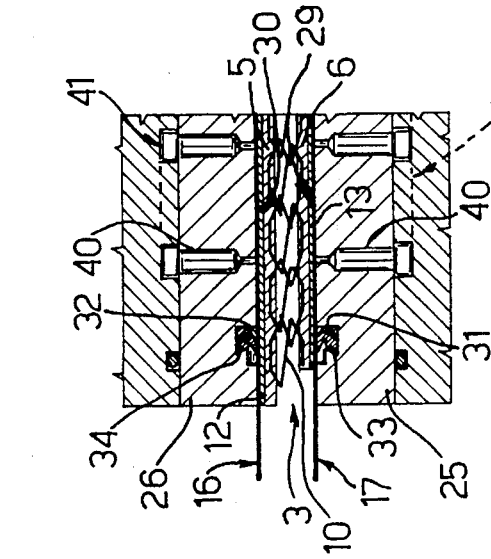

According to the method of the present invention, the layered structure 1, obtained by substantially known methods from continuous sheets which are then cut to the desired dimensions is inserted between a lower die 25 and an upper die 26 (FIG. 2) of a press 28 (best seen in FIG. 8) which has devices for fixing the structure 1 to the dies 25 and 26 and also has devices for heating the structure 1, enabling the resin 20 to polymerise, as will be clarified below. In particular, the dies 25 and 26 have respective flat faces 29 and 30 formed with rectangular, peripheral grooves 31 and 32 engaged by fluid-tight seals 33 and 34 with respective lips 35 and 36 which extend outwardly of the flat faces 29 and 30. The dies 25 and 26 are also provided with a plurality of vertical ducts 40 which extend within the dies perpendicular to the faces 29 and 30 and open into these faces 29 and 30, and are connected internally to crossed ducts 41 which extend parallel to the faces 29 and 30 and are connected to a respective pump 45 (illustrated schematically) to form vacuum suction means. The structure 1 also rests on the lower die 25 and the layer 17, which has greater transverse dimensions than the three-dimensional textile 3, rests on the lips 35 of the seal 33 so that the suction of air from the ducts 40 produces a low pressure between the layer 17 and the die 25 to ensure firm contact between the latter and the layer 17.

Figure 3:
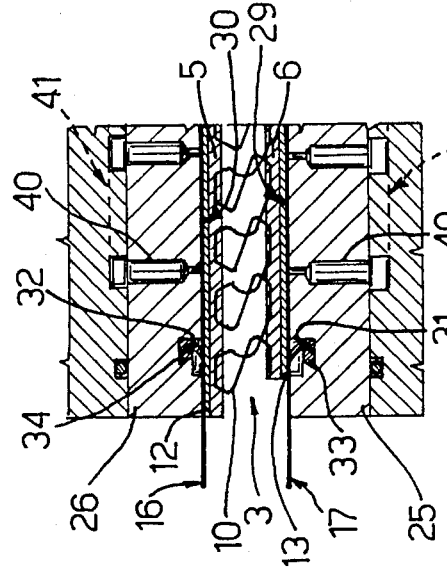
FIGS. 2 to 7 illustrate schematically, in longitudinal section, and in successive phases, parts of the apparatus used for the production of a composite structure according to the method of the present invention.

Subsequently (FIG. 3) the press 28 is closed, the upper die 26 being lowered onto the structure 1; during this phase a controlled pressure is exerted on the structure 1 to enable good cohesion to be achieved between the various layers and ensure that the resin 20 is distributed uniformly between the sheets 5 and 6 of the three-dimensional textile 3 and the sheets 12 and 13 and between the latter and the layers 16 and 17.

The pressure exerted on the structure 1 also eliminates any air bubbles present between all the surfaces in contact and compresses the seals 33 and 34 against the plates 16 and 17.

In this phase air is withdrawn by the vacuum pump 45 from the ducts 40 in the dies 25 and 26 so as to reduce the pressure between these latter and the layers 16 and 17 sufficiently to attach them firmly to the faces 29 and 30.

Figure 4:
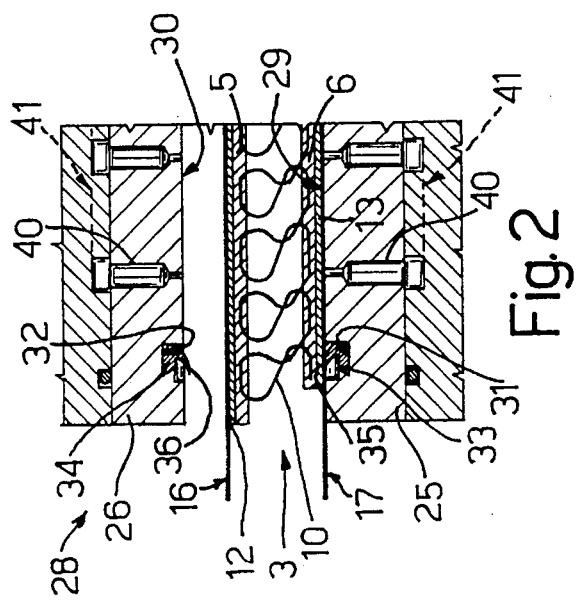

Subsequently (FIG. 4) the press 28 is opened, the die 26 being raised slowly through a distance no greater than the limit of the natural elastic recovery of the three-dimensional textile 3 due to the reaction of the combination of threads 10 which tend to straighten.

This operation must not detach the layers 16 and 17 from the sheets 12 and 13 and these from the sheets 5 and 6 of the three-dimensional textile 3.

During this phase, the heat produced within the dies 25 and 26 by conventional heating means, for example electrical resistances 46, reaches the outermost layers of the structure 1, that is the textile sheets 12 and 13, via the layers 16 and 17, and subsequently reaches the sheets of the three-dimensional textile 3 on which the resin 20 partially solidifies, ensuring the mutual adhesion of all the surfaces in contact. During this phase, the solidification process in the resin 20 which impregnates the threads 10, being in the region furthest from the heat source, is delayed; this enables the threads 10 to remain flexible through the subsequent phases of the process.

Figure 5:
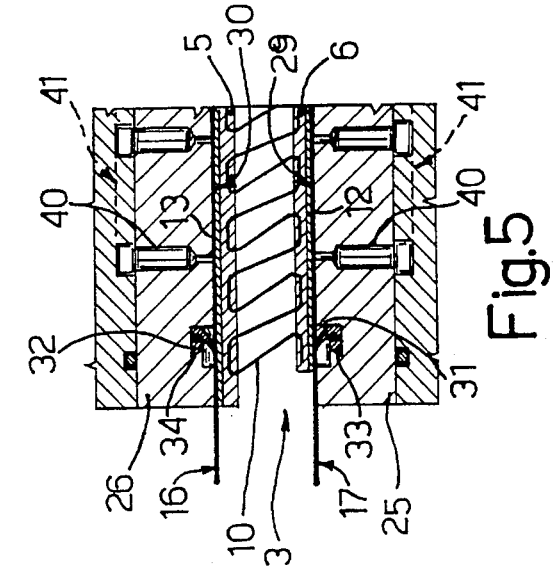

Subsequently (FIG. 5) the lower die 25 is released, enabling the latter to float freely in a plane parallel to the die 26.

The press 28 is opened further, the die 26 being raised through a distance such as to stretch the threads 10 of the three-dimensional textile 3. The adhesion of the sheets 5 and 6 to the sheets 12 and 13, and of these latter to the layers 16 and 17, is ensured during this traction by the vacuum effect due to the fact that air cannot penetrate the textiles impregnated with the partially solidified resin 20.

During this phase, notwithstanding the free flotation of the lower die 25, the threads 10 can not arrange themselves automatically perpendicular to the planes in which the sheets 5 and 6 lie thereby making a subsequent manual correction phase necessary.

Figure 6:
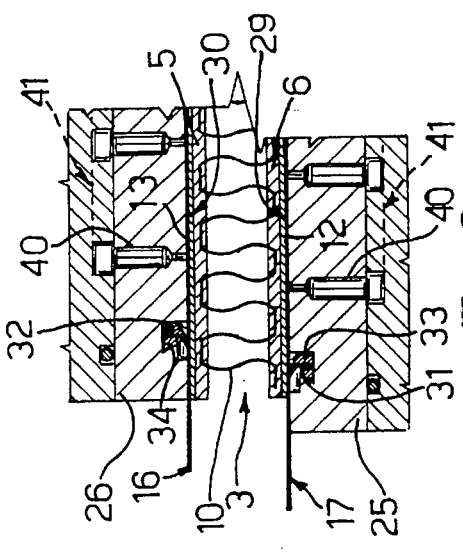

In this case (FIG. 6) the lower die 25 is moved manually by an operator to bring the threads 10 to substantially vertical positions and the die 25 is locked in this position.

Figure 7:
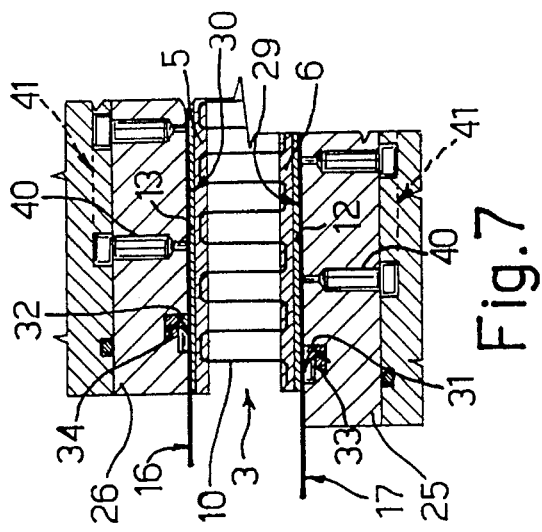

Subsequently (FIG. 7) the press 28 is opened again even further to distend the threads 10 completely and achieve the intended thickness of the structure 1.

The press 28 is then locked firmly in this position and the polymerisation is completed throughout the entire resin 20 which solidifies completely even in the region of the threads 10.

Subsequently, after the dies 25 and 26 have possibly been cooled with conventional means not illustrated, the vacuum pump 45 is disconnected and air is passed into the ducts 40 so that the layers 16 and 17 become detached from the faces 29 and 30 of the dies 25 and 26 of the press 28; finally the press 28 is opened completely and the layered structure 1 is removed.

In this structure 1, the threads 10 are completely rigid and extend perpendicular to the sheets 5 and 6, establishing a rigid connection between the sheets 5 and 6 themselves and forming a partially hollow structure because of the space present between the threads 10. This structure, moreover, may be filled with expanded resin, for example, polyurethane or phenolic foam, this being injected at the end of the phase in which the resin polymerises, illustrated in FIG. 7, to improve the mechanical, thermal and acoustic insulating properties of the composite structure.

The layers 16 and 17, which in this case are conveniently releasable films, may also subsequently be detached from the structure 1 when this is removed from the press 28; in this case, they serve as release sheets and define the flat surfaces which form after the resin 20 has solidified in the textiles 12 and 13. It would not in fact be possible to insert a structure formed solely from the three-dimensional textile 3, or the textile 3 and the textile sheets 12 and 13, in the press 28 since, on compression of layered structure 1, the resin 20 would enter the ducts 40 and obstruct them.

The use of the layers 16 and 17, moreover, enables perfectly flat surfaces to be determined, differing from those obtainable by the known methods.

Moreover, in order to render the difference in polymerisation between the resin 20 impregnating the sheets 5 and 6 of the textile 3 and the impregnated threads 10 more significant it is possible, before arranging the layered structure 1 between the dies 25 and 26 to spread a catalysing substance on one side of the layer 16 and 17 in contact with the impregnated sheets 5 and 6 or directly on the sheets 5 and 6 themselves. In this way the greater reactivity of the resin 20 in the contact zones between the sheets 5 and 6 and layers 16 and 17, already increased by the greater transfer of heat, is further increased, with respect to the reactivity of the resin impregnating the threads 10, by the local presence of a greater quantity of catalyst and therefore the polymerisation time of the resin 20 is reduced, which causes a stable connection between the contacting outer surfaces of the three-dimensional textile 3, guaranteeing a secure stretching of the threads 10 in the subsequent progressive opening phases of the press 28. Conveniently, the catalysing substance used for polyester resin can be methyl-ethyl ketone peroxide in percentages, for example, varying up to 3% for phenolic resins acid solutions can be utilized in percentages, for example, varying up to 15%, and for epoxy resins can be utilised resins based on amide in percentages, for example, varying between 30% and 50%.

Figure 8:
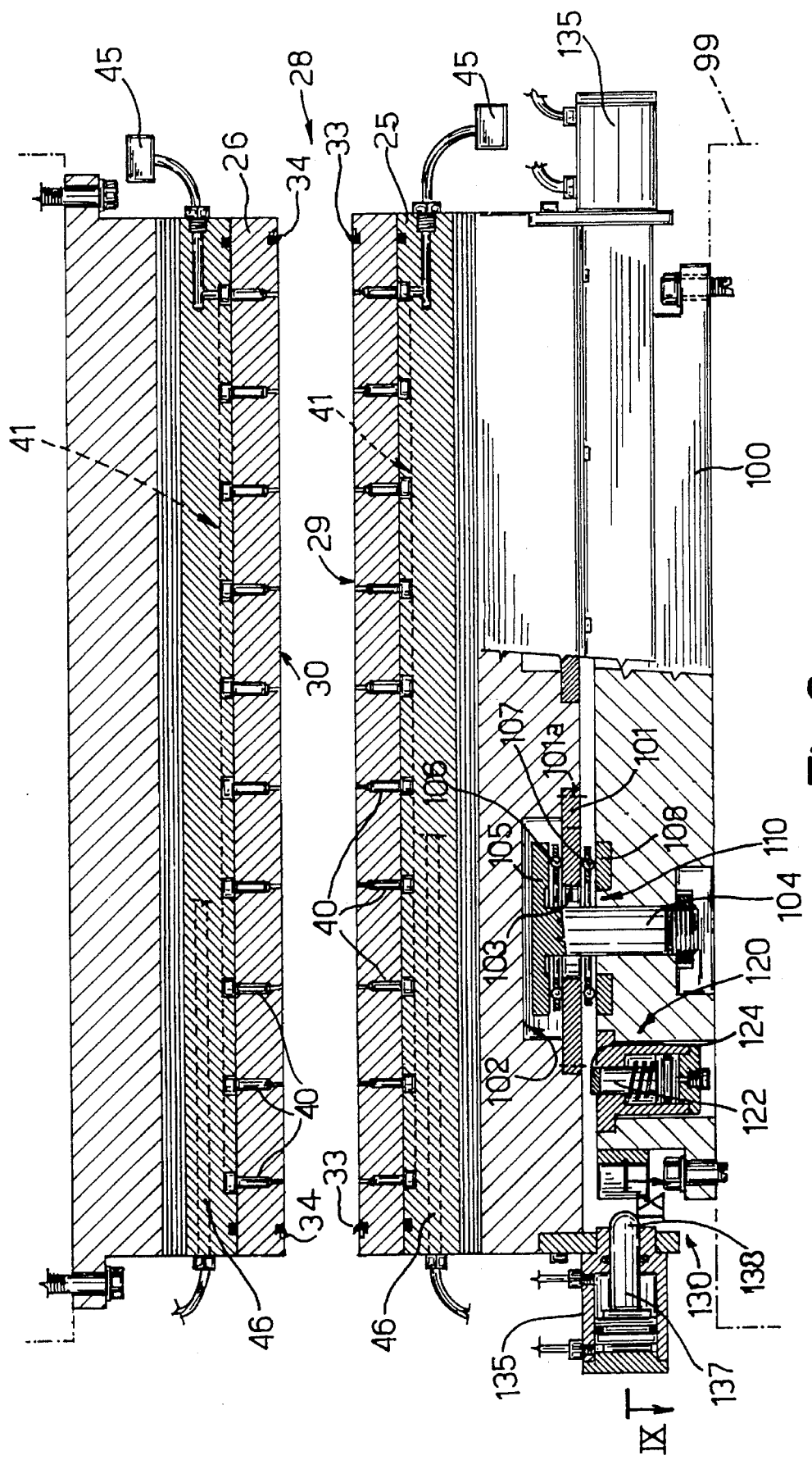
FIG. 8 is a complete longitudinal section of a press used for the production of the composite structure according to the present invention.

FIG. 8 illustrates the press 28 in greater detail, the press including a base 99 on which a body 100 supporting the lower die 25 is fixed, the die being slidable by means of rolling ball assemblies 110 (of known type) on the body 100 itself.

These assemblies 110 enable the die 25 to move in any direction in a plane parallel to the upper die 26. More particularly, each assembly 110 includes a plate 101 which is fixed by screws 101a to the body 100, is disposed so as to close a circular, downwardly-open recess 102 in the die 25 and has a through-hole 103 in which a shaft 104 is inserted, being fixed firmly at its lower end to the body 100 and provided at its upper end with a circular flange 105 inserted in the recess 102. The unit 110 further includes a first plurality of balls 106 disposed circumferentially in a first ring coaxial with the shaft 104 and inserted between the flange 105 and the plate 101, and a second plurality of balls 107 disposed circumferentially in second ring coaxial with the shaft 104 and inserted between the plate 101 and an annular plate 108 mounted on the body 100.

The body 100 is also provided with stop devices 120 for clamping the die 25 to the body 100 itself and each including a shaft 122 which is pneumatically actuable and movable towards the die 25 and adapted at one end 124 to press frictionally against the die 25 to prevent any movement in the plane of the die.

The die 25 also has two pairs of release devices 130 for releasing the die 25 within its own plane as well as for repositioning it, that is for returning the lower die 25 to a predefined position relative to the body 100 after the lower die has been moved in the preceding working cycle.

The devices 130 are conveniently disposed at the four opposite sides of the die 25 and each includes a respective pneumatic actuator 135 mounted so as to project outwardly and downwardly of the die 25 and provided with a respective movable rod 137 extending towards the body 100 and terminating in a spherical tip 138 facing the latter. These tips 138 of the actuators 135 are arranged to come to bear against abutment members 140 firmly fixed to the body 100.

Figure 9:
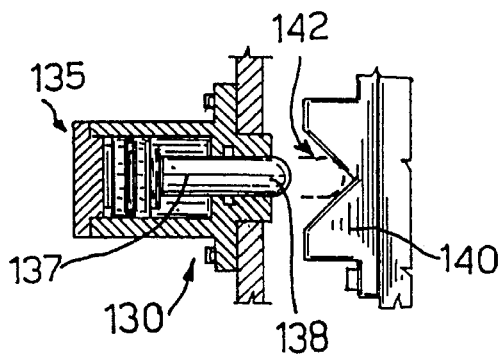
FIG. 9 illustrates a detail of FIG. 8 taken on the transverse section IX—IX.

More particularly, as illustrated in FIG. 9, each of the abutment members 40 has a wide V-shaped groove 142 which receives the tip 138 of the respective rod 137 in the repositioning phase. Thus, when the tip 138 of each rod 137 contacts the faces of the groove 142, the lower die 25 is returned to a defined position relative to the body 100.

From what has been explained above, it will be clear that the method of the present invention solves the problems of the known processes; indeed this process forms to advantage, in a simple and economic manner, a layered structure which is partially hollow and which has constant geometric and mechanical characteristics (for example, uniform thickness) and a specific shape.

It is clear finally that modifications and variations may be made to the present method without thereby departing from the protective scope of the method itself.

The thermo-setting resin 20, for example could be replaced by a thermoplastics resin (for example, a polyamide, a polyetherimide, a polyester ketone, a polyamide) impregnating the three-dimensional textile 3 and made fluid and subsequently cooled within the press 28.

Figure 10:
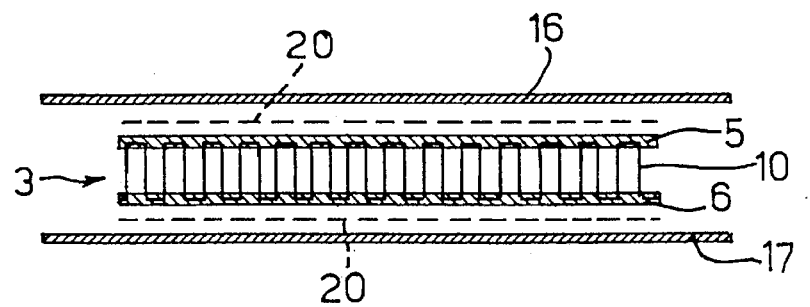
FIGS. 10, 11, 12 and 13 illustrate variants of the structure shown in FIG. 1.

The structure 1, as illustrated in FIG. 10 may be without the sheets 12 and 13, including solely the three-dimensional textile 3 and the plates 16 and 17 forming part of the structure itself. The removable plates 16 and 17 (FIG. 11) may also be covered with a gel-coat resin 160 or other surface finish deposited between the three-dimensional textile 3 and the plates 16 and 17. Thus, after the removal of the plates 16 and 17, the outer surfaces of the structure 1 are perfectly smooth and of agreeable appearance, giving the composite structure a valued aesthetic appearance.

Figure 12:
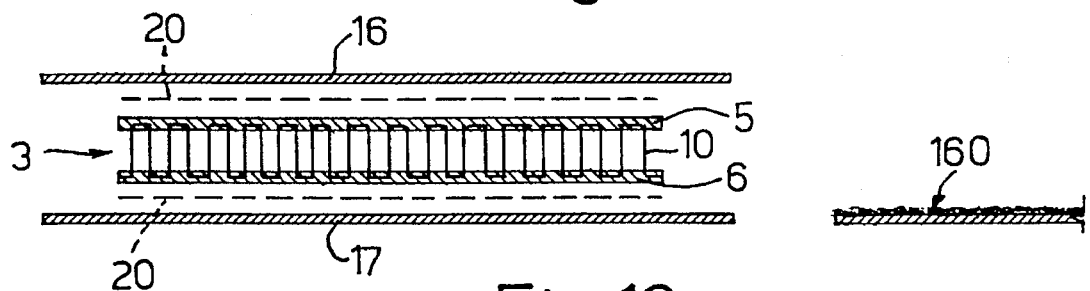

FIG. 12 illustrates a structure in which the upper sheet 16 is formed from a metal or plastics laminate and is kept firmly fixed to the composite structure while the lower plate 17 acts as a release sheet and is removed. This lower sheet 17 may also be covered with a gel-coat 160.

Figure 11:
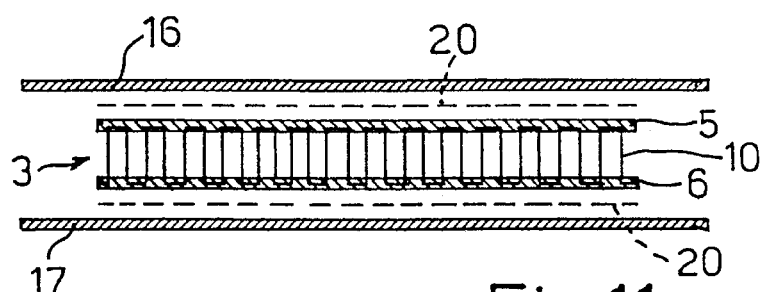
Figure 13:
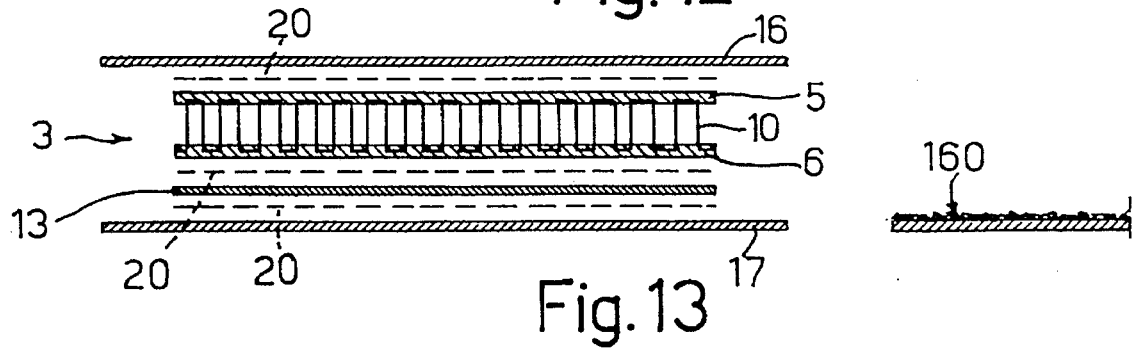

FIG. 13 illustrates a structure almost entirely the same as that shown in FIG. 11 but which differs from this solely in that it includes a textile sheet 13 between the three-dimensional textile 3 and the lower release plate 17.

Figure 16:
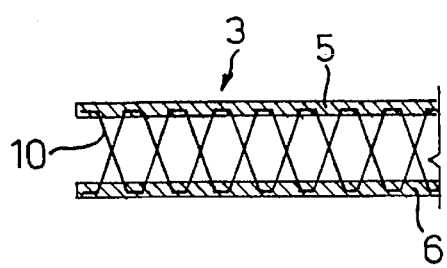
FIGS. 16, 17, 18 and 19 are four cross sections of three-dimensional textiles usable in the structure of FIG. 1 instead of the textiles illustrated in FIGS. 14 and 15.
Figure 17:
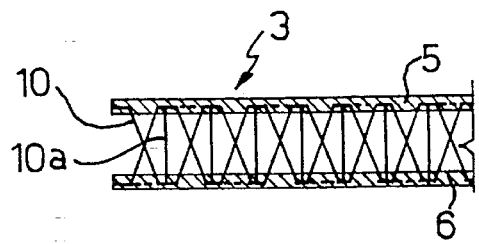
Figure 18:
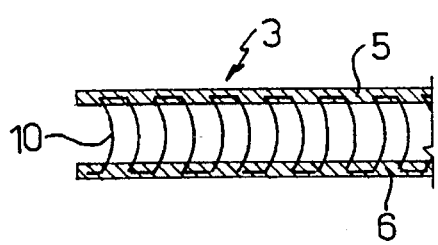

The threads 10, moreover, may be arranged to lie differently from those illustrated in FIGS. 1, 2–7, 14 and 15. More particularly (FIG. 16) the threads 10 may be inclined to the textile sheets 5 and 6 and may cross each other to form an X structure (or a V structure). Such a structure (FIG. 17), in addition to the threads 10 which form X-structures with each other, may include threads 10A disposed perpendicular to the textile sheets 5 and 6. Finally the threads 10 (FIG. 18) may be curved relative to the sheets 5 and 6.

Figure 19:
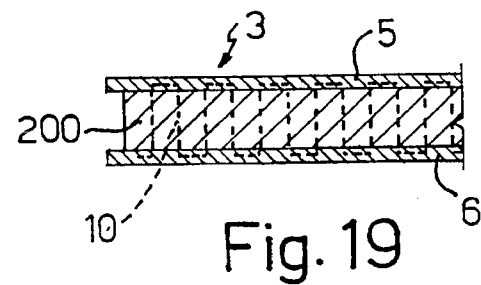

The sheets 5 and 6, moreover may be connected together (FIG. 19) by a textile piece 200 which extends substantially perpendicular to and between the facing surfaces of the sheets 5 and 6 and is firmly connected to these latter; the threads 10 are also present in such textile pieces 200 in addition to threads which lie parallel to the sheets 5 and 6.

The structure 1 could, moreover, be constituted by a plurality of superimposed layers of three-dimensional textile 3; conveniently a catalysing substance could be preliminary spread between the facing surfaces of these layers, for example between the sheets 5 and 6, in order locally to accelerate the polymerisation process of the resin to cause a stable connection between the facing surfaces of the various layers so as to guarantee the stretching of the threads 10 of the various internal layers during progressive opening of the press.

The phase of alignment of the two dies 25 and 26 could be eliminated when unnecessary and both the dies could be movable in parallel planes.

Finally the press 28 could be provided with devices other than those shown for the floating of the lower die 25 relative to the upper die 26. For example, it could be formed with commercially available ball-bearing or pneumatic support slides (air cushions).

Likewise, the electric heating means 46 for the dies 25 and 26 could be replaced by other means for accelerating the resin polymerisation process.

I claim:

1. A method for the production of composite structures with intermediate three-dimensional textiles, characterized in that it comprises:

a first phase in which a layered structure (1) is inserted between first and second dies (25,26) of a press (28); the layered structured (1) including at least one three-dimensional textile (3) constituted by two sheets (5,6) of textile disposed in parallel and connected together by at least one plurality of threads (10) extending from facing surfaces of the sheets (5,6); at least one pair of layers (16,17) disposed facing the said sheets (5,6) on the outside of the said structure (1); at least the said three-dimensional textile (3) also being impregnated with a resin (20); the dies (25,26) being provided with means (40,45) for attaching the said layers (16,17) to their surfaces;

a second phase in which the dies (25,26) are at least partially closed and the three-dimensional textile (3) is proposed between the layers (line 17) and the resin (20) impregnating the said sheets distributes itself between the sheets (5,6) and layers (16,17) and permeating the threads (10) uniformly;

a third phase in which the layers (16,17) are attached firmly to the dies (25,26) by the means (40,45) for attaching;

a fourth phase in which the dies (25,26) are reopened through a certain distance within the limit of the natural elastic recovery of the three-dimensional textile (3) due to the action of the combination of threads (10) tending to straighten themselves;

a fifth phase in which at least a partial polymerisation of the resin (20) between the layers (16,17) and the outermost sheets (5,6) of the three-dimensional textile (3) is achieved while the resin (20) impregnating the threads (10) remains substantially in a plastic state;

a sixth phase in which the dies (25,26) are opened to a predetermined distance in order to more the sheets (5,6) away from each other and extend the threads (10) to form a partially hollow structure;

a seventh phase in which the structure (1) remains clamped between the two dies (25,26) until the polymerization of the resin (20) is complete;

an eighth phase in which the layers (16,17) are released from the surfaces of the dies (25,26), the dies (25,26) an opened completely and the layered structure (1) is removed from the press (28).

2. A method according to claim 1, characterised in that, in the sixth phase, at least one of the dies (25,26) is rendered movable relative to the other in the plane perpendicular to the spacing between the dies (25,26) then the dies (25,26) are moved apart again through a first distance to extend the said threads (10) at least partially, the movable die (25) being moved in the sixth phase so as to dispose the threads (10) in a direction substantially perpendicular to the planes of the sheets (5,6) of the three-dimensional textile; the dies (25,26) then being locked in position in their planes and dies (25,26) then being moved further apart through a second predetermined distance to extend the threads (10) completely in order to achieve an overall desired thickness of the structure (1).

3. A method according to claim 1 or claim 2, characterised in that the said dies (25,26) are heated to accelerate the process of polymerisation of the said resin (20); in the said fifth phase the said dies (25,26), by heating substantially only the outer most parts of the said structure, cause substantially only the said partial polymerisation of the resin (20) on the outer sheets (5,6) of the said three-dimensional textile (3).

4. A method according to claim 1, characterised in that the said resin (20) is a thermosetting resin.

5. A method according to claim 4, characterised in that, before the said first phase, a catalysing substance is applied between the said layers (16,17) and the said sheets (5,6) of the said three-dimensional textile in order locally to accelerate the process of polymerisation of the said resin (20).

6. A method according to claim 1, characterised by the fact that the said resin (20) is a thermoplastic resin.

7. A method according to claim 1, characterised in that it includes a further phase,after the seventh phase, in which the three-dimensional textile (3) in the layered structure (1) is filled with an expanded resin.

8. A method according to claim 1, characterised in that the resin (20), by at least partially polymerising in the said second phase, firmly fixes the sheets (5,6) to the layers (16,17).

9. A method according to claim 1, characterised in that it includes a ninth phase in which the layers (16,17) are detached mechanically and removed from the layered structure (1).

10. A method according to claim 1, characterised in that the layers (16,17) have a greater extent than that of the layered structure (1), in order to separate the latter from the surfaces of the dies (25,26).

11. A method according to claim 1, characterised in that the said layered structure includes at least one plurality of superimposed layers of the said three-dimensional textile (3).

12. A method according to claim 11, characterised in that before the said first phase a catalysing substance is applied between the facing surfaces of the said layers to accelerate the polymerization process of the said resin (20).

13. Apparatus for the production of composite structures with intermediate three-dimensional textiles, characterized in that it comprises:

a press (28) having first and second dies (25,26) each having flat faces (29,30) moveable to and from each other;

said dies (25,26) being provided with pneumatic fixing means (40,45) for attaching sheet plate layers (16,17) to their faces;

said lower die (25) being moveable relative to said upper die (26) along at least two perpendicular axes in a plane parallel to said faces (29,30).

14. Apparatus according to claim 13, characterised in that the pneumatic fixing means comprise a plurality of ducts (40) which extend within the dies (25,26) and open into the surfaces of the dies themselves, and which are arranged to be connected to a vacuum pump (45), and at least one peripheral seal (33,34) extending around each of the dies (25,26) and adapted to cooperate with the plates (16,17) to achieve a fluid-tight connection.

15. Apparatus according to claim 13, characterised in that it includes means (122) for fixing the relative positions of the dies (25,26).

16. Apparatus according to claim 15, characterised in that the fixing means (122) include frictional clamping means.

17. Apparatus according to claim 13, characterised in that it includes means (130) for releasing at least one of the dies (25,26).

18. Apparatus according to claim 13, characterised in that it includes means (130) for centering the relative positions of the dies (25,26).

19. Apparatus according to claim 17, characterised in that the release means (130) when operated in reverse constitute the centering means (130).

20. Apparatus according to claim 13 characterised in that it includes means (46) for heating the dies (25,26) to accelerate the polymerisation of a resin (20).

21. Apparatus according to claim 20 characterised in that the heating means comprise electrical resistances (46).

22. Apparatus according to claim 13, characterised in that at least one (25) of the dies has means for enabling said die to move at least along the two perpendicular axes parallel to the plane of the other of the dies (25,26).

23. Apparatus according to claim 22, characterised in that the means include at least one rolling ball assembly (110).

24. Apparatus according to claim 22, characterised in that the means include pneumatic support slides.

\* \* \* \* \*